United States Patent [19]

Sato

[11] Patent Number: 4,642,256

[45] Date of Patent: Feb. 10, 1987

[54] LABEL STRIP

[75] Inventor: Yoshio Sato, Iwate, Japan

[73] Assignee: Kabushiki Kaisha Sato, Japan

[21] Appl. No.: 715,776

[22] Filed: Mar. 26, 1985

[30] Foreign Application Priority Data

Sep. 6, 1982 [JP] Japan ............................... 57-153978

[51] Int. Cl.4 ............................ B32B 3/10; B32B 7/06

[52] U.S. Cl. ...................................... 428/42; 428/136; 428/137; 428/41; 428/906; 40/2 R

[58] Field of Search ...................... 428/40, 41, 42, 131, 428/136, 137, 134, 138, 906; 40/2 R; 283/81

[56] References Cited

U.S. PATENT DOCUMENTS 4,081,309 3/1978 Jenkins .................................. 428/42

4,393,107 7/1983 Jenkins ............................ 428/136 X

*Primary Examiner*—Alexander S. Thomas

*Attorney, Agent, or Firm*—Ostrolenk, Faber, Gerb & Soffen

[57] ABSTRACT

A label strip for being applied by a label applying machine. The label strip includes a support material base web with a release agent on its upper surface and comprises a series of labels adhesively applied to the release surface of the support material. The underlying support material has a plurality of feed cut groups arrayed longitudinally along the support material layer. Each feed cut group includes a longitudinally extending cut and a respective upstream and downstream transversely extending stopper cut which intersect the longitudinal cut, thereby defining feeding tongues at both sides of the longitudinal cut between the stopper cuts. The upstream stopper cut is always longer, i.e. wider across the label strip, than the downstream stopper cut. Various straight or curved or bent shapes for one or both of the stopper cuts are disclosed. At each longitudinal location having a feed cut group, there may be a plurality of such feed cut groups arrayed across the support material. Labeling machines for dispensing the labels from the label strip are disclosed.

11 Claims, 18 Drawing Figures

LABEL STRIP

BACKGROUND OF THE INVENTION

1. Field of the Invention

This invention relates to a label strip of pressure-sensitive adhesively secured labels in a roll which is suitable for use in a labeling machine that either has or lacks a printing mechanism.

More particularly, the invention relates to a label strip which is made of a tape-like support material and a label material overload on and temporarily adhered to the support material. Feeding cut means are defined in the label strip. The label strip is set in a labeling machine such that the feeding cut means engages with a feeding pin or feeding pawl of the labeling machine so as to feed the label strip by an operator grasping/releasing an operation lever.

2. Description of the Prior Art

In order to adhere each label from a label strip roll to an item, the label strip must be set in a labeling machine and must be fed at predetermined pitches or lengths.

One conventional label strip is fed step-by-step by a friction force between the label strip and a feeding means of a labeling machine. Other type label strips include engaging means, such as a series of cuts, apertures or notches formed in the support material of a label strip. Each engaging means of the label strip engages with a feeding means in the labeling machine, such as a feeding pin, to feed the label strip step by step. However, the conventional feeding means cannot feed the label strip accurately and properly.

BRIEF SUMMARY OF THE INVENTION

It is, therefore, a principal object of the present invention to eliminate the drawbacks described above.

It is another object of the present invention to provide a label strip which is properly and accurately fed in a labeling machine.

It is still another object of the present invention to provide a label strip which eliminates tearing of feeding cuts in the supporting material of the label strip.

It is still another object of the present invention to provide a label strip having a feeding cut means in a novel shape.

To achieve the above objects of the present invention, there is provided a pressure-sensitive label strip comprising a label material with an adhesive applied on one surface and a support material with a release agent applied on one surface. The label material is overlaid on the support material such that the label material is temporarily adhered to the support material. The label material is peeled off by backward bending of the support material.

A plurality of feeding cut groups are formed in the support material at equal pitches or spacing along a longitudinal direction of the support material. Each of the plurality of feeding cut groups comprises at least one longitudinal cut extending along the longitudinal direction and a pair comprising an upstream and a downstream stopper cut connected at the two ends of the longitudinal cut. The upstream stopper cut is longer than the downstream stopper cut.

The foregoing and other objects and features of the present invention will become apparent from the following description of preferred embodiments of the invention, taken in connection with the accompanying drawings.

BRIEF DESCRIPTION OF THE DRAWINGS

FIGS. 1 and 2 show a label strip according to a first embodiment of the present invention, in which FIG. 1 is a partial cutaway perspective view illustrating how a label material is peeled off from a support material, and FIG. 2 is a plan view thereof;

FIGS. 3 and 4 show a label strip according to a second embodiment of the present invention, in which FIG. 3 is a perspective view of the label strip in a roll, and FIG. 4 is a plan view thereof;

FIGS. 14 to 18 show a labeling machine with which label strips according to the ninth and tenth embodiments of the present invention may be used, in which FIG. 14 is a perspective view of a label cassette, FIG. 15 is a perspective view illustrating how a label cassette door may be opened to mount the label strip roll therein, FIG. 16 is a perspective view of the labeling machine, FIG. 17 is a longitudinal sectional view thereof when the label strip roll is not mounted therein, and FIG. 18 is a longitudinal sectional view thereof when the label strip roll is mounted therein.

DETAILED DESCRIPTION OF THE PREFERRED EMBODIMENTS

Figure 1:
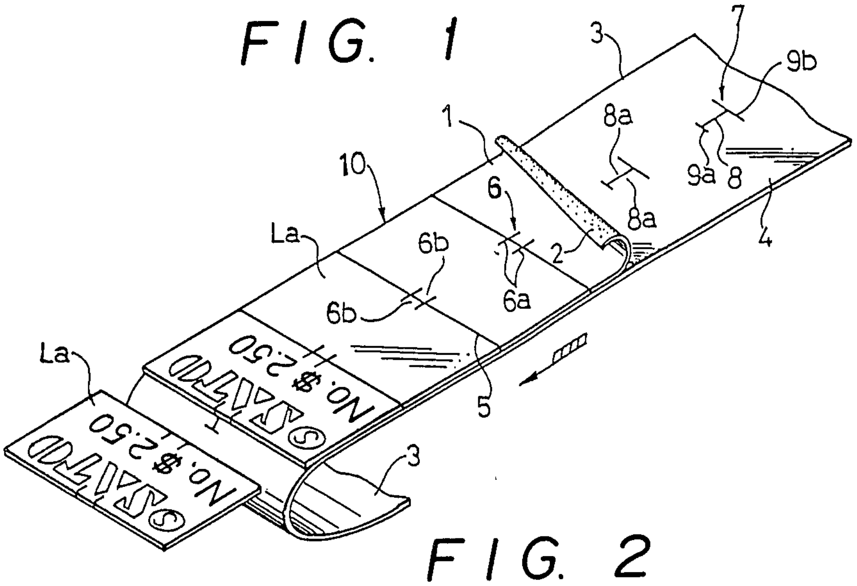

A label strip according to a first embodiment of the present invention will be described with reference to FIGS. 1 and 2.

A tape-like label strip 10 comprises a layer of a label material 1 and another layer in the form of a tape or elongate strip of a support material 3, which layers are overlaid. A layer of a pressure-sensitive adhesive 2 is applied to the lower surface of the label material 1. A release agent 4 is applied to the upper surface of the support material 3 which opposes the adhesive 2. The label material 1 is temporarily adhered to the surface of the release agent 4 and can be easily peeled off. Parting cut lines 5 are formed in the upper layer of label material 1 at equal intervals and extend along a direction perpendicular to the longitudinal direction of the label strip, such that a plurality of single label pieces La are aligned adjacent to each other along the longitudinal direction. Furthermore, feeding cut groups 6 are formed in the label material such that each cut group 6 comprises a pair of feeding cut lines *6a* formed crossing the corresponding parting cut line 5 between adjacent label pieces La. The pair of feeding cut lines *6a* and the parting cut line 5 define a pair of facing feeding tongues *6b* between the cut lines *6a*.

Feeding cut groups 7 are formed in the lower strip of support material 3 at respective positions opposing and to be overlaid by the feeding cut groups 6 formed in the label material 1 at corresponding equal intervals along the longitudinal direction. Each feeding cut group 7 comprises a combination of a longitudinal cut 8 and downstream and upstream stopper cuts *9a* and *9b*. The longitudinal cut 8 extends in the longitudinal direction of the support material 3. The pair of stopper cuts *9a* and 9*b* are connected at the two ends of the corresponding longitudinal cut 8, are laterally symmetrical about the longitudinal cut 8, and extend perpendicularly to the corresponding longitudinal cut 8. Feeding tongues 8*a* are defined at the two opposite sides of the longitudinal cut 8 along the direction of width of the label strip and between the stopper cuts. The stopper cut 9*b* which is positioned at the upstream side (direction opposite to the arrow in FIG. 1) of the longitudinal cut 8 is longer than the stopper cut 9*a* which is positioned at the downstream side thereof.

The placement of the cuts 5 and 6*a* is coordinated with the placement of the cuts 8 and 9 so that the feeding tongues 6*b* overlie the feeding tongues 8*a* and when the tongues 8*a* are raised by a feeding pin or pawl of the label strip feed means, the tongues 6*b* will be correspondingly raised.

A label strip according to a second embodiment of the present invention is described with reference to FIGS. 3 and 4.

A tape-like label strip 20 comprises a strip of label material 11 and a strip of support material 13 which are overlaid on each other. A pressure-sensitive adhesive 12 is applied to the lower surface of the label material 11. A release agent 14 is applied to the upper surface of the support material 13 which opposes the adhesive 12. The label material 11 is temporarily adhered to the surface of the release agent 14 and can be easily peeled off.

Parting cut lines 15 are formed in the label material 11 at equal intervals along the longitudinal direction of the label material 11, so as to form single label pieces Lb. Two feeding cut groups 16 are formed in effective areas of each single label piece Lb such that one pair of substantially U-shaped feeding cut lines 16*a* are formed parallel to each other and along the width direction of the label strip. The vertexes or webs of the U-shaped feeding cut lines 16*a* face in the direction opposite to the feed direction of the label strip. The cut lines 16*a* define feeding tongues 16*b*, respectively, which are separated at the trailing end of the tongues.

In the same manner as in the first embodiment, feeding cut groups 17 are formed in the support material at equal intervals at positions opposing and being overlaid by the corresponding feeding cut groups 16. Each feeding cut group 17 comprises a combination of a longitudinal cut 18 and stopper cuts 19*a* and 19*b*. The longitudinal cut 18 extends along the longitudinal direction of the support material. The pair of stopper cuts 19*a* and 19*b* are connected at the two ends of the corresponding longitudinal cut 18, are laterally symmetrical about the longitudinal cut 18, and extend perpendicularly to the longitudinal cut 18. Feeding tongues 18*a* are defined at two sides of the longitudinal cut 18 along the direction of width of the label strip. In the same manner as in the first embodiment, the stopper cut 19*b* which is positioned at the upstream side (direction opposite to an arrow in FIG. 4) of the support material 13 is longer than the stopper cut 19*a* which is positioned at the downstream side. The feeding tongues 16*b* overlie the feeding tongues 18*a* so that they may be raised together.

Figure 2:
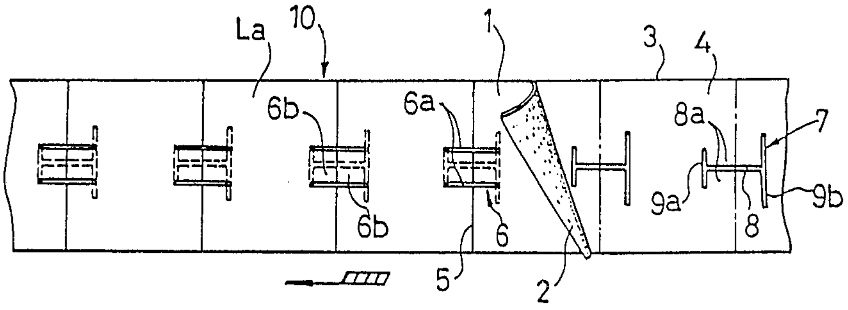
Figure 5:
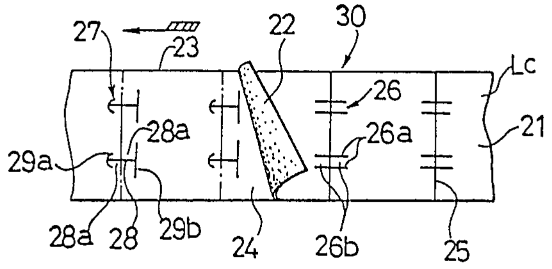
FIGS. 5 to 12 are partially cutaway plan views of label strips according to a third through a tenth embodiment of the invention, respectively.

In a third embodiment shown in FIG. 5, a tape-like label strip 30 comprises a layer of label material 21 and a layer of support material 23 which are overlaid in the same manner as in the first embodiment of FIGS. 1 and 2. As in the first embodiment, there is adhesive 22 beneath the label material, parting cut lines 25 between label pieces Lc, feeding cut groups 26 at the borders between adjacent label pieces for defining feeding cut lines 26*a* parallel to each other along the width direction of the label material and which, in turn, define feeding tongues 26*a* on the label pieces Lc.

The support material 23 is coated with release agent 24. Each of the pair of parallel feeding cut groups 27 formed at intervals along the tape-like support material 23 opposes and is overlaid by corresponding feeding cut group 26 of the label material 21. Each feeding cut group 27 comprises a longitudinal cut 28 which extends along the longitudinal direction of the label material 21 and stopper cuts 29*a* and 29*b* connected at two ends of the longitudinal cut 28. The stopper cuts 29*a* and 29*b* are laterally symmetrical about the longitudinal cut 28. The stopper cut 29*b* located upstream (direction opposite to the arrow in FIG. 5) of the support material 23 is perpendicular to the longitudinal cut 28. However, the stopper cut 29*a* located downstream of the support material 23 is arcuately curved convexly toward the downstream direction and concavely to the other stopper cut 29*b*. The upstream stopper cut 29*b* is longer than the downstream stopper cut 29*a* in the same manner as in the first and second embodiments. Also, as in the first and second embodiments, the longitudinal cut 28 and the stopper cuts 29*a* and 29*b* define feeding tongues 28*a* extending along the direction of width of the label strip. The feeding tongues 28*a* are overlaid by the feeding tongues 26*a* which are raised together.

Figure 6:
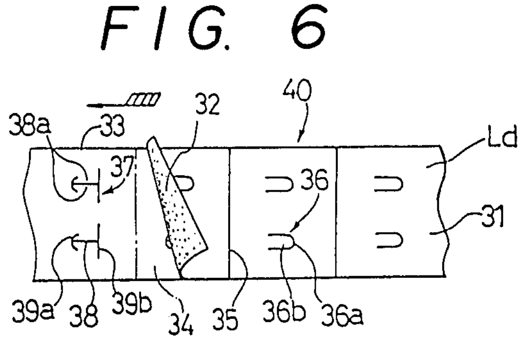

In a fourth embodiment shown in FIG. 6, a tape-like label strip 40 comprises a layer of label material 31 and a layer of support material 33 which are overlaid. The label material 31 has single label pieces Ld of the type in the second embodiment (FIGS. 3 and 4). Beneath the label material is an adhesive 32. The label pieces Ld are separated by parting cut lines 35. Each label piece has a pair of parallel feeding cut groups 36 defined by U-shaped feeding cut lines 36*a*. These define feeding tongues 36*b* of the label pieces Ld.

The support material 33 has a release agent 34 applied to its surface to which the label strip is applied. Each feeding cut group 37 of the tape-like support material 33 has the same shape as that in the third embodiment (FIG. 5) and includes longitudinal cut 38, transverse feeding tongues 38*a* defined by the cut 38 and downstream and upstream stopper cuts 39*a* and 39*b*, respectively. The feeding tongues 36*b* overlie the feeding tongues 38*a*.

Figure 7:
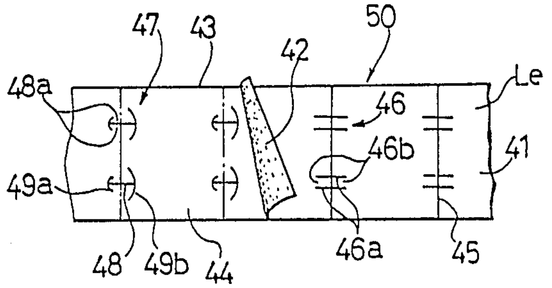

In a fifth embodiment shown in FIG. 7, a tape-like label strip 50 comprises a layer of label material 41 and a layer of support material 43 which are overlaid. The label material 41 has single label pieces Le and is provided with feeding cut groups 46 of the same shape and position as those in the first embodiment (FIGS. 1 and 2). Other parts of the fifth embodiment which correspond to those in the first embodiment are designated by reference numerals obtained by adding 40, and a detailed description thereof is omitted.

Each feeding cut group 47 formed in the tape-like support material 43 is formed at a position opposing the corresponding feeding cut group 46 of the label material 41. The feeding cut group 47 comprises a longitudinal cut 48 and the arcuate stopper cuts 49*a* and 49*b* connected at the ends of the longitudinal cut 48, to be laterally symmetrical about the longitudinal cut 48. The arcuate stopper cut 49*a* is convexly curved toward the downstream direction and the arcuate stopper cut 49*b* is convexly curved toward the opposite upstream direction, whereby each of these stopper cuts is concavely curved with respect to the other. Feeding tongues 48*a* are defined at the two sides of the longitudinal cut 48. The upstream arcuate stopper cut **49*b* is longer than the downstream arcuate stopper cut 49*a*** in the same manner as in the first to fourth embodiments.

Figure 3:
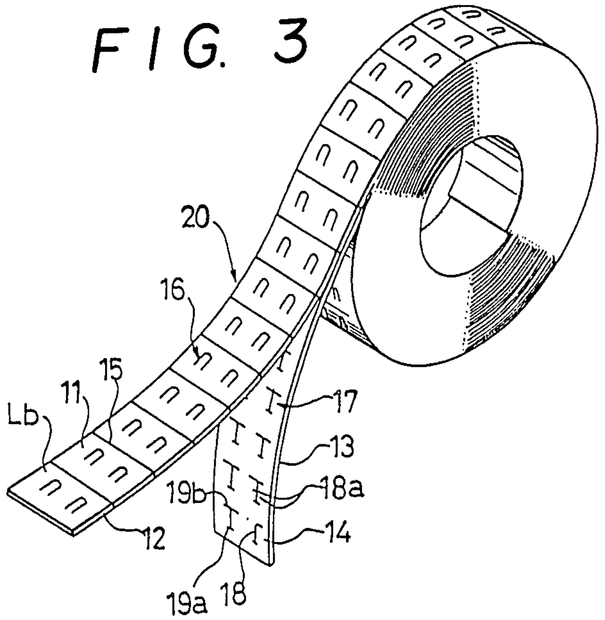
Figure 4:
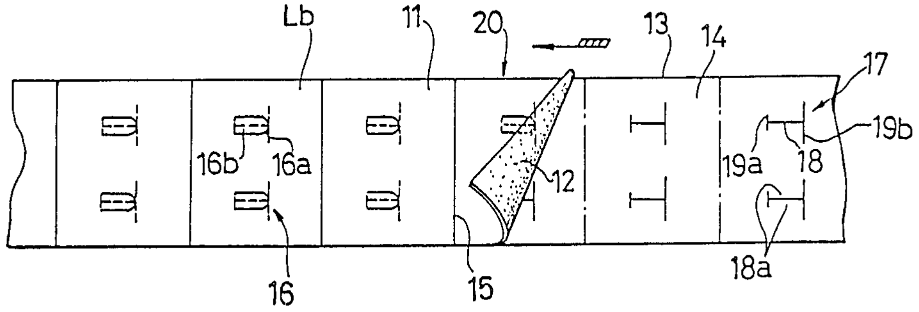
Figure 8:
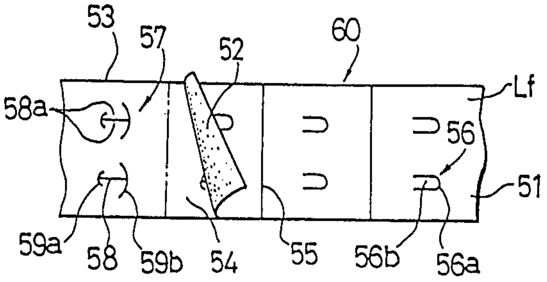

In a sixth embodiment shown in FIG. 8, a layer of label material 51 of a tape-like label strip 60 which is cut into single label pieces Lf is provided with feeding cut groups 56 in the same manner as in the second embodiment (FIGS. 3 and 4). A layer of support material 53 is provided with feeding cut groups 57 in the same manner as in the fifth embodiment (FIG. 7). Other parts of the sixth embodiment correspond to the first embodiment and are designated by a reference numeral obtained by adding 50 to the corresponding reference numeral, and a detailed description thereof will be omitted.

Figure 9:
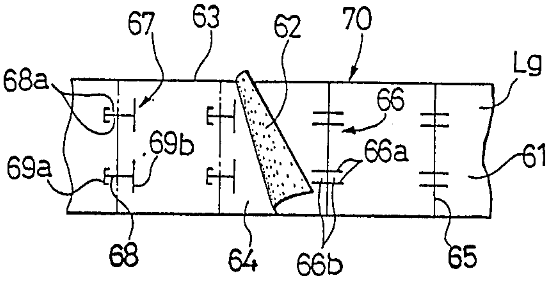

In a seventh embodiment shown in FIG. 9, a tape-like label strip 70 comprises a layer of label material 61 and a layer of support material 63 which are overlaid. The label material 61 has single label pieces Lg and is provided with feeding cut groups 66, in the same manner as in the first embodiment (FIGS. 1 and 2). Other parts of the seventh embodiment correspond to the first embodiment and are designated by a reference numeral obtained by adding 60 to the corresponding reference numeral in the first embodiment, and a detailed description thereof is omitted.

Each feeding cut group 67 is formed in the tape-like support material 63 at a position opposing and overlying the corresponding feeding cut group 66 of the label material 61. The feeding cut group 67 comprises longitudinal cut 68 extending along the longitudinal direction of the label strip and stopper cuts **69*a* and 69*b* connected at the ends of the longitudinal cut 68. The stopper cuts 69*a* and 69*b* are laterally symmetrical about the longitudinal cut 68. The upstream stopper cut 69*b* is a straight cut located upstream along the support material 63 and is perpendicular to the longitudinal cut 68. The downstream stopper cut 69*a* has a hook-like shape bent toward the stopper cut 69*b*. The cut 69*a* has two short, parallel, spaced apart legs joined by a straight connecting line. Those two legs extend back upstream toward the other stopper cut 69*b*. The stopper cut 69*b* is longer than the stopper cut 69*a* as in the first to sixth embodiments. The longitudinal cut 68 and the stopper cuts 69*a* and 69*b* define feeding tongues 68*a* and 68*b*** extending along the direction of width of the level strip.

Figure 10:
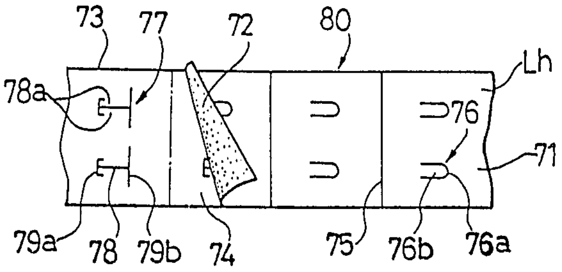

In an eighth embodiment shown in FIG. 10, a layer of label material 71 of a tape-like label strip 80 comprised of single label pieces Lh is provided with feeding cut groups 76 in the same manner as in the second embodiment (FIGS. 3 and 4). A layer of support material 73 is provided with feeding cut groups 77 in the same manner as in the seventh embodient (FIG. 9). Other parts of the eighth embodiment correspond to parts of the previous embodiments and are designated by adding 70 to the corresponding reference numeral of the first embodiment, and a detailed description thereof is omitted.

A label strip according to a ninth embodiment of the present invention is described with reference to FIG. 11. A tape-like label strip 90 comprises a tape-like support material 83. The label material 81 comprises substantially elliptical label pieces which are temporarily adhered to the tape-like support material 83. An adhesive 82 is applied to the lower surfaces of the label pieces and a release agent 84 is applied to the upper surface of the support material 83 which opposes the adhesive 82. Therefore, the label material 81 is temporarily adhered to the surface of the release agent 84 and can be easily peeled off.

An arbitrary word ("SPECIAL SALE" is this embodiment) is printed on the label material 81 in advance. The label material 81 comprises a plurality of single label pieces Li aligned on the support material 83 at regularly spaced apart intervals.

The support material 83 is provided with feeding cut groups 87 in the same manner as in the second embodiment. Each feeding cut group 87 comprises a longitudinal cut 88 along the length of the label strip and stopper cuts **89*a* and 89*b* connected at the ends of the longitudinal cut 88. A pair of feeding tongues 88*a* are defined along the longitudinal cut 88. The upstream stopper cut 89*b* is longer than the downstream stopper cut 89*a***, in the same manner as in the first to eighth embodiments.

The ninth embodiment differs from the first to eighth embodiments in that no feeding cut lines are formed in the label material 81 in the ninth embodiment.

Figure 12:
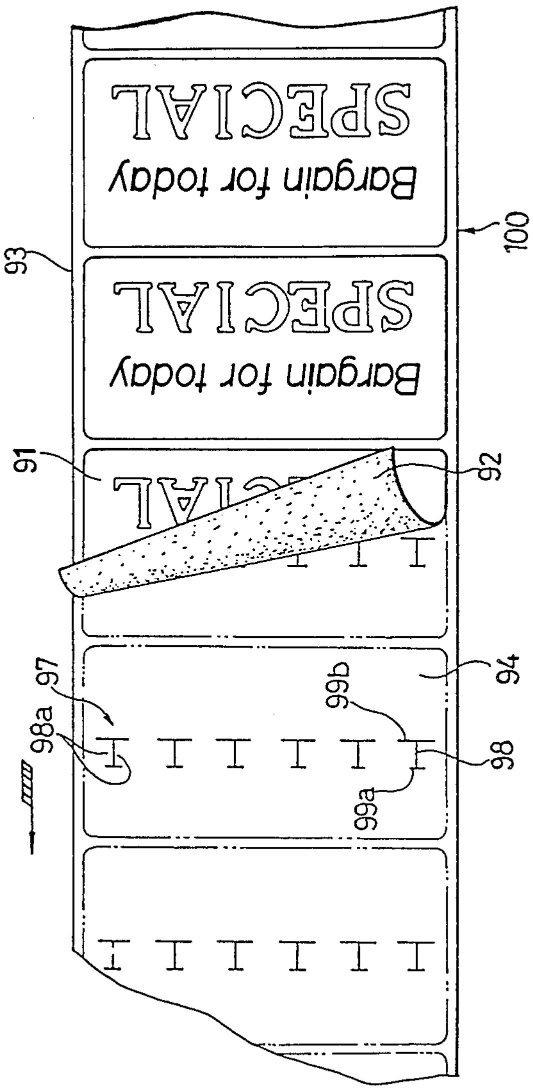

In the tenth embodiment shown in FIG. 12, a tape-like label strip 100 comprises a layer of label material 91 and a layer of support material 93 which are overlaid. An adhesive 92 is applied to the lower surface of the label material 91, and a release agent 94 is applied to the upper surface of the support material 93 which opposes the adhesive 92. The label material 91 is temporarily adhered to the surface of the release agent 94 and can be easily peeled off.

An arbitrary word is printed on each of single label pieces Lj of the label material 91. The label pieces Lj are aligned and adjacent to each other on the support material 93, in the same manner as in the ninth embodiment (FIG. 11).

Six feeding cut groups 97 are formed in the support material 93 and aligned along the width direction of the label strip. Each feeding cut group 97 comprises a longitudinal cut 98 extending along the direction indicated by the arrow and transverse stopper cuts **99*a* and 99*b* connected to the ends of the longitudinal cut 98. Feeding tongues 98*a* are defined at both sides of each longitudinal cut 98. The stopper cut 99*b* is longer than the stopper cut 99*a* in the same manner as in the first to ninth embodiments. In the tenth embodiment, since the label strip 100 is quite wide, six longitudinal cuts 98** are formed in a line along the width of the label strip. If only two longitudinal cuts had been formed, the wide label strip could be properly fed.

The label strip of the tenth embodiment does not have any feeding cut line in the label material 91, just as in the ninth embodiment.

In each of the first to tenth embodiments, a pair of stopper cuts connected to the ends of a longitudinal cut are symmetrical about the longitudinal cut. However, the present invention is not limited to this construction. An asymmetrical construction allows the same effects as are obtained in the first to tenth embodiments to be obtained.

Figure 13:
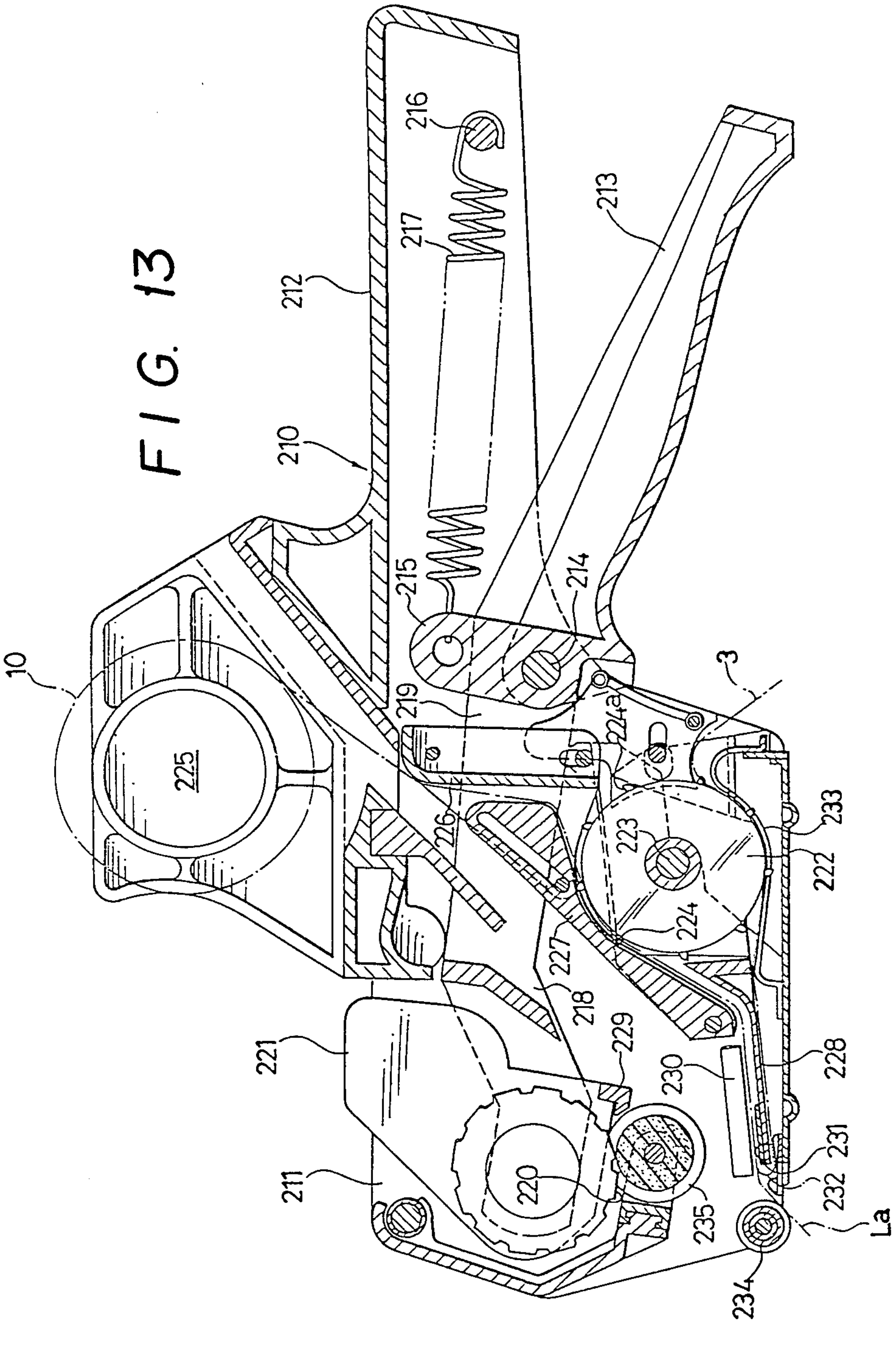
FIG. 13 is a longitudinal sectional view of a labeling machine with which label strips according to the first to eighth embodiments of the present invention may be used.

The label strips 10, 20, 30, 40, 50, 60, 70 and 80 can be used in a labeling machine 210 shown in FIG. 13. The label strips 90 and 100 can be used in a labeling machine 310 shown in FIGS. 14 to 18.

For illustrative convenience, in the following description, the label strip 10 according to the first embodiment is used in the labeling machine 210, and the label strip 90 according to the ninth embodiment is used in the labeling machine 310.

An example of the labeling machine 210 is shown in U.S. Pat. No. 4,176,603. In the schematic showing herein of the labeling machine 210, a hand lever 213 is disposed to oppose a grip 212. The grip is integrally formed with a pair of frames 211. The hand lever pivots with respect to the grip at a pivot pin 214. A return spring 217 is hooked between spring setting members 215 and 216 of the grip 212 and the hand lever 213. When an operator releases the hand lever 213 after grasping it and closing it against the grip 212, the hand lever 213 is returned to its initial position by means of the return spring 217.

A printing portion 218 and a drive portion 219 are disposed in an extended forward of the hand lever 213 beyond the pivot pin 214. A printer 221 having a rotatable type face disc 220 is fixed in the printing portion 218 of the hand lever 213. A sector-shaped drive gear (not shown) is disposed in the drive portion 219 so as to extend to the vicinity of the pivot pin 214.

A disc 222 having a ratchet meshing with the drive gear of the hand lever 213 is rotatably mounted on a major shaft 223 mounted on the pair of frames 211. Feeding pins 224 each having a semi-circular sectional shape are formed on the circumference of the disc 22 at given pitches so as to feed the tape-like label strip 10 by units of one pitch. The feeding pins 224 have the same size, i.e. lateral width, as the downstream stopper cuts *9a*, *19a*, *29a*, *39a*, *49a*, *59a*, *69a*, *79a*, *89a* and *99a*. The flat sides of the semi-circular pins face downstream.

In forward feeding of the label strip 10, the label strip 10 has a roll shape and is mounted in a label holder 225. The distal end of the strip is guided by a label guide member 226 and passes through a space formed between the disc 222 and a label press member 227. The distal end is then guided onto a platen 228 positioned to oppose the printer 221. In the label strip 10, a pair of feeding cut groups 6 of the label material 1 and an opposing feeding cut group 7 of the support material 3 engage with a corresponding feeding pin 224. The label press member 227 is located against the surface of the label material 1.

After an operator grasps the hand lever 213 and the grip 212 together and then releases the hand lever 213, the disc 222 is rotated counterclockwise by one pitch. Therefore, since the support material 3 and the label material 1 overlaid thereon engage with the feeding pin 224, the label strip 10 is fed by one pitch (corresponding to the length of one label piece La). More particularly, in forward feeding of the label strip 10, a specific feeding pin 224 is inserted in one longitudinal cut 8 of the support material 3, so that the feeding tongues 8a are upraised upward along the longitudinal direction of the label strip 10. Since this feeding pin 224 is inserted in the longitudinal cut 8 from the side of the stopper cut 9b (upstream of the longitudinal cut 8), the feeding pin can be properly inserted in the longitudinal cut 8.

Upon counterclockwise rotation of the disc 222, the feeding pin 224 moves slightly in the longitudinal cut 8. The flat surface 224a of the feeding pin 224 having a semicircular cross section is brought into contact with the downstream stopper cut 9a. The feeding load is then distributed, and unstable feeding caused by local concentration of the feeding load is eliminated. the feeding pin 224 is further inserted upwardly from the longitudinal cut 8 of the support material 3 to the intermediate portion between the feeding cut lines 6a of the label material and the parting cut line 5. Therefore, the feeding tongues 6b are formed at the adjacent ends of the label pieces and are separated by the parting cut line 5. As a result, the forward feeding load is supported by the feeding tongues 6b.

The label strip 10 fed by the feeding pin 224 by one pitch is conveyed onto the platen 228 when the operator releases the hand lever 213 after grasping the hand lever 213 and the grip 212 together.

In this case, the feeding tongues 6b and 8a of the label strip 10 which are kept raised by the feeding pin 224 return to their original flat positions when the printer 221 operated as interlocked with gripping of the hand lever 213 abuts against the platen 228. More particularly, a label correction member 229 which is disposed at the rear end of the printer 221 is urged against the label strip 10 just before it is fed onto the platen 228. The label correction member 229 serves to restore the feeding tongures 6b and 8a to their original flat positions. The label correction is performed on the labels one pitch before the printing operation is performed.

The support material 3 of the label strip 10 is formed in an inverting portion 232 in the vicinity of the distal end of the plate 228. The inverting portion 232 comprises a small loop defined by upper and lower regulation members 230 and 231 which sandwich the platen 228 between them. Only the support material 3 is guided by a label press member 233 to the rear of the labeler and now beneath the disc 222. Therefore, the next feeding pin 224 of the disc 222 engages with the next stopper cut 9b and then the corresponding stopper cut 9a, and the support material 3 is pulled in the forward direction. The feeding pin 224 is first inserted in the stopper cut 9b when the feeding pin 224 engages with the stopper cuts 9a and 9b in the manner as previously described. Therefore, the feeding pin 224 is properly inserted in the longitudinal cut 8.

When the feeding direction of the support material 3 is inverted at 232, the single label piece La of the label material 1 which is temporarily adhered thereto is peeled off from the support material 3. The label piece La is then fed to the lower surface of an application roller 234 and is applied to an item when the application roller 234 is pressed against the item. An ink roller 235 applies ink to the type face disc 220 of the printer 221. The movement of the ink roller 235 is interlocked with the grasping of the hand lever 213.

The pair of feeding tongues 8a and 8b formed in the support material 3 are formed to extend in a direction perpendicular to the longitudinal direction (i.e., the direction of width of the label strip). Therefore, even when the feeding direction of the support material 3 is inverted at the inverting portion 232, the end of the cut may not be torn by the inertia force. The feeding tongues 6b formed in the label material 1 extend in both the feeding direction (leading edge of one label piece) and in a direction opposite to the feeding direction (trailing edge of one label piece). However, since the feeding direction of the label material 1 is not inverted, unlike the support material 3, the label material 1 may not tear.

The cross-sectional shape of the feeding pins 224 provided on the circumference of the disc 222 at equal angular intervals is preferably determined such that the feeding pin 224 is brought into surface contact with the stopper cut 9a (19a, 29a, 39a, 49a, 59a, 69a or 79a) and between the stopper cuts 9a and 9b (19a and 19b, 29a and 29b, 39a and 39b, 49a and 49b, 59a and 59b, 69a and 69b or 79a and 79b) formed at the downstream and upstream ends of the longitudinal cut 8 (18, 28, 38, 48, 58, 68 and 78) of the support material 3 (13, 23, 33, 43, 53, 63 or 73) of the label strip 10 (20, 30, 40, 50, 60, 70 or 80) of the first (second, third, fourth, fifth, sixth, seventh or eighth) embodiment.

The downstream stopper cuts 9*a*, 19*b*, 69*a*, 79*a*, 89*a* and 99*a* according to the first embodiment (FIGS. 1 and 2), the second embodiment (FIGS. 3 and 4), the seventh embodiment (FIG. 9), the eighth embodiment (FIG. 10), the ninth embodiment (FIG. 11) and the tenth embodiment (FIG. 12) have a linear shape. Therefore, the feeding pins 224 and feeding pawls 350 preferably have a semi-circular sectional shape and are oriented such that the surface which contacts the downstream cut is a flat surface.

The downstream stopper cuts 29*a*, 39*a*, 49*a* and 59*a* according to the third embodiment (FIG. 5), the fourth embodiment (FIG. 6), the fifth embodiment (FIG. 7) and the sixth embodiment (FIG. 8) are arcuate convexly toward the downstream direction. Therefore, the feeding pins 224 for these stopper cuts must have a circular sectional shape. Of course, feeding pins having an arcuate surface, which is intended for contacting an arcuate downstream stopper cut, may also be used for contacting an uncurved or linear downstream stopper cut so as to obtain the same effect as in the previous embodiments.

Next described in the use of the label strip 90 of the ninth embodiment of the present invention in the labeling machine 310. See, for example, U.S. application Ser. Nos. 368,732, filed Apr. 15, 1982 and 354,060, filed Mar. 2, 1982 for examples of such machine.

Figure 16:
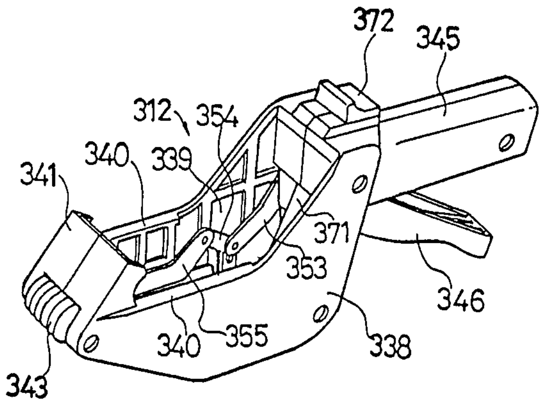

The labeling machine 310 comprises a label cassette 311 (FIG. 14) for holding a roll of the label strip 90 having an arbitrary word printed on each label piece, and a labeling unit 312 (FIG. 16). The labeling unit 312 detachably mounts the label cassette 311 therein to feed the tapelike label strip 90 and to separate the label material 81 from the support material 83, thereby allowing application of each single label piece Li to an item.

A reel 314 is rotatably mounted on one of a pair of frames 313 of the label cassette 311, so that the roll of the label strip 90 can be rotatably wound around the reel 314.

Figure 18:
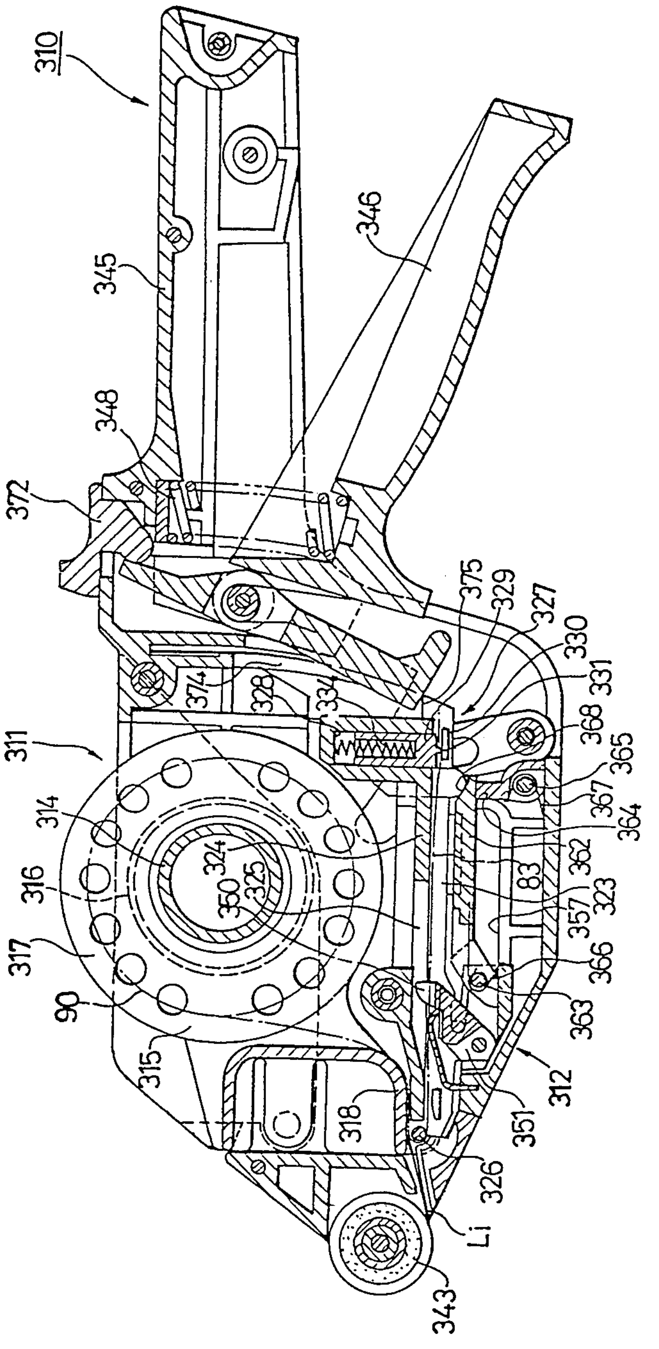

A disc 315 is mounted on an annular projection 316 (FIG. 18) extending from the inner surface of one of the frames 313. A disc-shaped disarray prevention plate 317 for preventing disarray of the roll of the label strip 90 along the width of the roll is mounted at the reel 314 at the rear of the annular projection 316 (FIG. 18). An arcuate label press portion 318 is formed at the front end of the label cassette 311.

Figure 15:
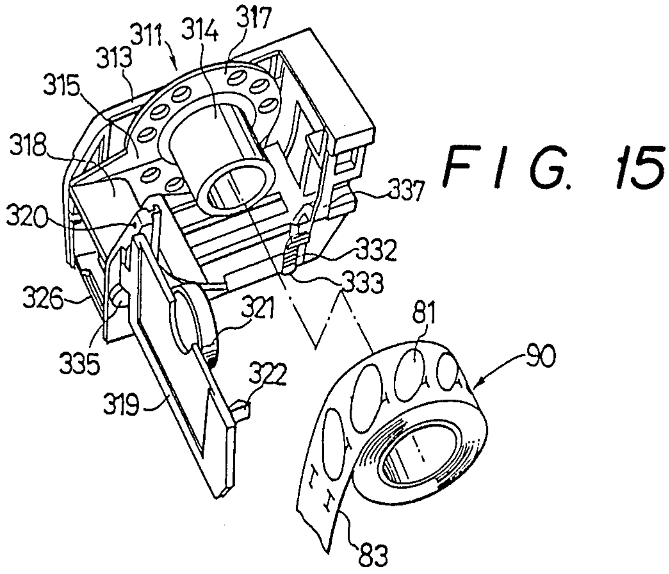

A door 319 is mounted on the label cassette 311 to pivot about a pin 320, so that the door 319 can be opened and closed. A circular press plate 321 is disposed at the central inner surface of the door 319. An elastic hook 322 is disposed at the inner upper end of the door 319 (FIG. 15).

A U-shaped support material guide groove 323 is formed in the bottom surface of the label cassette 311 so as to extend from the front end to the rear end. A pair of pawl guides 325 extend on a bottom plate 324 along the longitudinal direction of the label cassette 311 (FIG. 18). An inverting pin 326 is disposed at the front end portion of the bottom plate 324 so as to invert the feeding direction of the support material 83 of the lael strip. A support material press mechanism 327 is disposed at the rear end portion of the bottom plate 324.

A press mechanism 327 comprises a press member 329 mounted to be vertically movable in a recess 328 of the frame 313, and a plate 330 fixed at the rear end of the guide groove 323. A needle 331 extends downward from the lower surface of the press member 329. Pinch pieces 332 (FIGS. 14 and 15) are formed integrally with two side surfaces of the press member 329, respectively. Semi-circular engaging tongues 333 are formed at the lower portions of the pitch pieces 332, respectively. The press member 329 is always biased downward by a spring 334 housed in the recess 328. As a result, the engaging tongues 333 extend downward from the bottom surface of the label cassette 311 in normal operation. At the same time, the press member 329 abuts against the upper surface of the plate 330.

The plate 330 is disposed with respect to the bottom plate 324 to form a sufficient space therebetween to allow the support material 83 to pass through. An aperture is formed at substantially the center of the press member 329 to engage with the needle 331.

Figure 14:
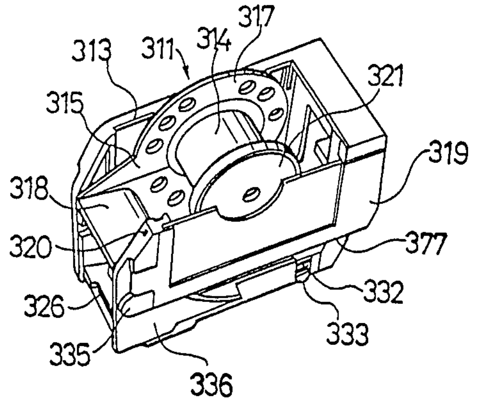

As shown in FIGS. 14 and 15, semi-circular engaging projections 335 are formed at front portions of the two sides of the label cassette 311. The lower side surfaces of the projections 335 are slightly recessed to serve as mount portions 336 for mounting the cassette 311 in the labeling unit 312. An engaging portion 337 engages with the elastic hook 322 of the door 319 (FIG. 15).

The labeling unit 312 is described with reference to FIGS. 16 and 17. The inner upper portion of the frames 338 serves as a storage portion 339 for the label cassette 311. The horizontal upper edges of the frames 338 project slightly inward to form label cassette receiving portions 340. A pair of cassette engaging recesses 342 are formed on the inner surface of respective front walls 341 of the frames 338. A label piece application roller 343 is rotatably mounted at the front end of the frame 338. A label dispensing port 344 is formed beneath the lower portion of the roller 343.

The rear portions of the frames 338 extend rigidly to form a grip 345. A hand lever 346 is mounted below the grip 345 such that the front end of the hand lever 346 is pivotable about a pin 347 mounted across the frames 338. A return spring 348 is mounted between the hand lever 346 and the grip 345, thereby always biasing the hand lever 346 clockwise.

A feeding mechanism 349 is disposed at the inner lower portion of the frames 338 to feed the support material 83. The feeding mechanism 349 comprises a pawl member 351 having a pair of semi-circular feeding pawls 350 at an upper end thereof, a holding frame 352 for holding the pawl member 351 and first to third links 353, 354 and 355 for moving the holding frame 352 back and forth. The size including the width and the profile of the feeding pawls 350 is substantially the same as that of the downstream stopper cuts 89*a* (or 99*a* of the tenth embodiment shown in FIG. 12) of the support material 83.

One end of the first link 353 is coupled to the hand lever 346, and a roller 356 mounted at the other end thereof is fitted in an elongate hole 357 in the middle portion of the second link 354. The lower end of the second link 354 is pivotally mounted on a pin 358 mounted across the frames 338. The upper end of the second link 354 is pivotally coupled to the pin 359 of the third link 355. The front end of the third link 355 is mounted on the holding frame 352.

The holding frame 352 has a U-shaped configuration when viewed from the top. A pair of rollers (not shown) are respectively mounted at two side surfaces thereof. These rollers are fitted in guide grooves 360 formed in the inner suraces of the frames 338, respectively.

Figure 17:
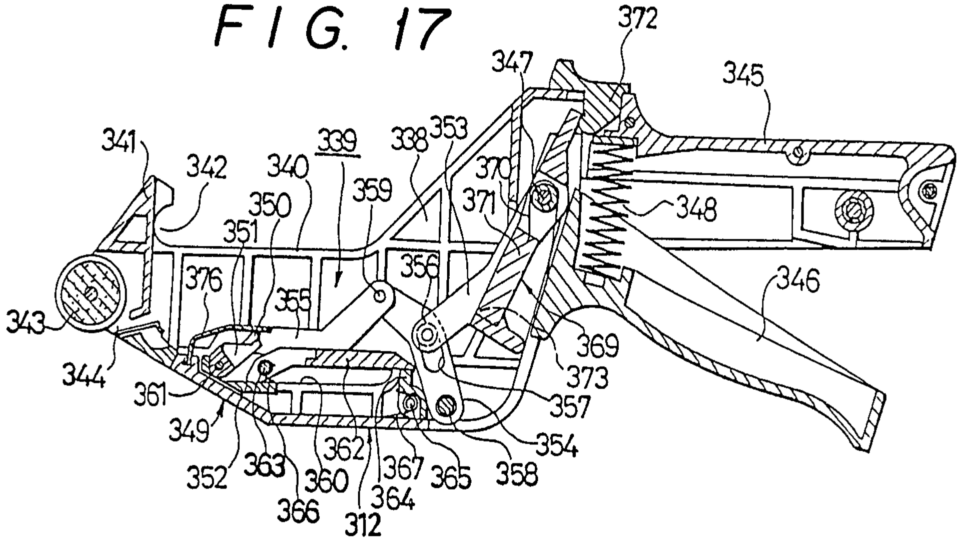

The pawl member 351 is pivotally mounted on a pin 361 transversely mounted in the holding frame 352 and is always biased by a spring (not shown) counterclockwise in FIG. 17.

A push-up plate 362 is pivotally mounted on a pin 363 transversely mounted at the rear end of the holding frame 352. A support member 364 is pivotally mounted on a pin 365 transversely mounted across the frames 338. The push-up plate 362 and the support member 364 are respectively biased by springs 366 and 367 such that the push-up plate 362 is biased counterclockwise in FIG. 17 and the support member 364 is biased clockwise in FIG. 17. Therefore, in the stationary condition shown in FIG. 18, the upper surface of the support member 364 abuts against and supports the lower rear end face of the push-up plate 362. A tapered portion 368 is formed at the upper rear end face of the push-up plate 362.

A lock mechanism 369 is dispsed at the inner rear portion of the frames 338 to lock the label cassette 311 to the labeling unit 312 (FIG. 17). The lock mechanism comprises a lock member 371 pivotally mounted on the frames 338 and always biased clockwise by a spring 370 and a release button 372 mounted on the upper rear end of the frame 338 to be slidable back and forth such that part of the release button 372 abuts against the lock member 371. When the label cassette 311 is mounted, a lower end corner 373 of the lock member engages with an engaging portion 375 which is formed below an opening 374 to extend from the rear surface of the label cassette 311, thereby locking the label cassette 311 (FIGS. 17 and 18).

A support material press piece 376 comprising a leaf spring is moumnted on the frame 338 in front of the pawl member 351.

The operation of the hand labeler 310 is now described. The operator opens the door 319 of the label cassette 311, as shown in FIG. 15. The roll of the label strip 90 is mounted on the reel 314. The operator then closes the door 319. The disc 315 stands vertical such that the label press portion 318 is positioned upward. The distal end of the tape-like label strip 90 is pulled out in order to peel off several label pieces Li from the support material 83. The operator inverts or reverses only the support material 83 backward around the front end of the inverting pin 326 so as to insert the distal end of the support material 83 between the press member 329 and the plate 330. To do this, the operator presses the pinch pieces 332 by hand to move the press member 329 upward to allow insertion of the distal end of the support material 83 between the press member 329 and the plate 330. When the operator then releases the pinch pieces 332, the press member 329 is moved downward by the biasing force of the spring 334. Therefore, the press member 329 clamps the support material 83 against the plate 330. At the same time, the needle 331 pierces and fixes the support material 83. The standing disc 315 is then pivoted to the initial position, as shown in FIG. 18 so as to abut the label press portion 318 against the label strip 90.

The operator inserts the mount portions 336 of the label cassette 311 in the storage portion 339 while the engaging projections 335 of the front end of the label cassette 311 are engaged with the engaging recesses 342 of the labeling unit 312. In this case, stepped portions 377 (one of which is formed on the lower surface of the door 319) formed at two sides of the label cassette 311 are placed on the receiving portions 340, respectively. At the same time, the label cassette 311 is automatically locked by the lock mechanism 369. When the label cassette 311 is inserted, the engaging portion 375 causes the lock member 371 to rotate counterclockwise against the biasing force of the spring 370, so that the label cassette 311 is moved downward. When the engaging portion 375 passes the lower end corner 373 of the lock member 371, the lock member 371 returns to the initial position, so that the lower end corner 373 engages with the engaging portion 375, thereby locking the label cassette 311 (FIG. 18).

In this condition, when the operator grasps the hand lever 346, the holding frame 352 is horizontally moved backward (to the right in FIG. 18) along the guide grooves 360 through the first to third links 353 to 355. Upon backward movement of the holding frame 352, the feeding pawls 350 of the pawl member 351 are inserted in the longitudinal cuts 88, respectively, of the support material 83. The two pairs of feeding tongues **88*a* stand upward. It should be noted that the feeding pawls 350 are inserted from the stopper cuts 89*b* (the upstream stopper cuts 89*b* are longer than the downstream stopper cuts 89*a*) of the stopper cuts 89*a* and 89*b*, respectively. Therefore, the feeding pawls 350 are properly inserted in the respective longitudinal cuts 88. The semi-circular feeding pawls 350 move slightly in the longitudinal cuts 88 and are brought into surface contact with the respective downstream stopper cuts 89*a*, thereby feeding the support material 83. In this case, since each feeding pawl 350 is brought into surface contact with the corresponding downstream stopper cut 89*a*, the feeding load can be distributed but not locally concentrated, thereby preventing unstable feeding. The feeding pawls 350 feed the support material 83 and the push-up plate 362 to move the engaging tongues 333 of the press member 329 upward. As a result, the support material 83 is released from the needle 331 of the press member 329, thereby smoothly feeding the support material 83** to the outside of the labeling unit.

In this condition, when the operator grasps the hand lever 346, the push-up plate 362 is moved backward to disengage the lower surface of the push-up plate 362 from the support member 364. The press member 329 is moved downward to the initial position while the press member 329 urges the push-up plate 362 counterclockwise against the biasing force of the spring 334. The support material 83 is fixed again by the press member 329 and the needle 331.

During feeding of the support material 83, the label strip 90 is horizontally defined by the label press portion 318 and the inverting pin 326 at the front end of the labeling unit 312. Only the support material 83 is inverted at an acute angle, so that the label material 81 is peeled off from the support member 83 and moves forward. As a result, each single label piece Li is fed from the label dispensing port 344 toward the lower surface of the application roller 343.

The single label piece Li can be adhered to an item by pressing the lower surface (adhesion surface) of the label piece Li against the item using the lower surface of the application roller 343, in the same manner as in the hand labeler 210. Therefore, the label piece Li can be adhered to the item by the action of the application roller 343.

When the operator releases the hand lever 346, the hand lever 346 is returned to its initial position by the biasing force of the return spring 348. At the same time, the holding frame 352 is moved forward through the first to third links 353 to 355 and returns to the state as shown in FIG. 18.

When the operator wishes to remove the label cassette 311 from the labeling unit 312, he pushes the release button 372 toward the front, so that the lock member 371 is pivoted counterclockwise and the lower end corner 373 thereof is disengaged from the engaging portion 375 of the label cassette 311. At the same time, the rear portion of the label cassette 311 slightly floats by the biasing force of the support material press piece 376 for pressing the lower surface of the support material 83 at the front portion of the support material guide groove 323. Therefore, the operator can readily remove the label cassette 311.

The pair of feeding tongues 88*a* are formed in the support material 83 along the width thereof (i.e., along the transverse direction of the support material 83). Even when the feeding direction of the support material 83 is inverted at the inverting pn 326, the ends of the cuts may not be torn by the inertia force.

Figure 11:
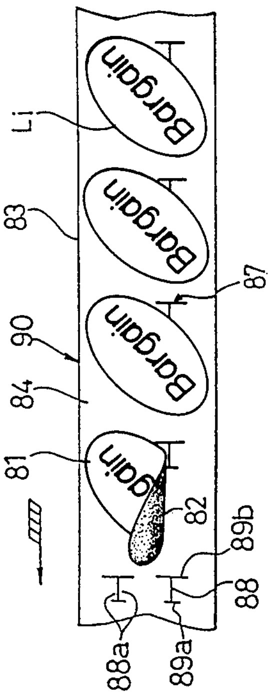

The label strip 100 of the tenth embodiment shown in FIG. 12 has six longitudinal cuts 98 parallel to each other along the width of the support material 83, since the label piece and the support material of the tenth embodiment is larger than that of the ninth embodiment (FIG. 11). When the label strip 100 is used, six feeding pawls must of course be used.

As described above, in the label strip having the support material and the label material overlying the support material, the feeding cut groups are formed in the support material at equal intervals along the longitudinal direction. Each feeding cut group has at least one longitudinal cut extending along the longitudinal direction of the support material and a pair of stopper cuts connected at the ends of the longitudinal cut. The upstream stopper cut is longer than the downstream stopper cut. Therefore, the following advantages are obtained:

(1) When the feeding pin (feeding pawl) is inserted in the longitudinal cut formed in the support material, the upstream stopper cut is widely opened so that the feeding pin (feeding pawl) can properly engage with the longitudinal cut, thereby guaranteeing proper feeding of the label strip.

(2) In order to feed the support material by the feeding pin (feeding pawl), the feeding pin (feeding pawl) moves slightly downstream in the longitudinal cut and is brought into surface contact with the downstream stopper cut. In this case, the size of the feeding pin is substantially the same as that of the downstream stopper cut. Therefore, the feeding load is distributed over the wall of the downstream cut and is not locally concentrated, thereby preventing unstable feeding.

(3) In the large label strip, a plurality of feeding cut groups are formed parallel to each other along the width of the label strip. When the support material is fed, the downstream stopper cuts having a size smaller than the upstream stopper cuts receive the feeding load through the feeding pins (feeding pawls). Therefore, the distance between adjacent feeding cut groups is increased, thereby preventing the support material from tearing.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A strip of pressure-sensitive labels comprising an elongate web of support material with one surface for supporting labels thereon; label material including a series of labels, each label having an underside to which adhesive is applied and the individual labels being overlaid on the one surface of the support material and being peelable off the support material;

a plurality of feeding cut groups defined in the layer of support material at intervals longitudinally along the support material; each of the feeding cut groups comprising one longitudinal cut extending longitudinally along the web of support material and further comprising an upstream trasnsverse cut intersecting the longitudinal cut at the upstream end thereof with respect to the movement of the support material and a downstream stopper cut intersecting the longitudinal cut at the downstream end thereof wherein the upstream stopper cut extends transversely across the support material a greater distance than the downstream stopper cut; the said longitudinal cut and the transverse stopper cuts together defining two first feeding tongues in the support material at the opposite sides of the longitudinal cut between the stopper cuts; the labels on the support material having second feeding cuts defined therein and the second feeding cuts in the labels being shaped to define second tongues in the labels; the second cuts in the labels being positioned so that the second in the labels overlie respective first feeding tongues in the support material, such that upraising of first feeding tongues in the support material raises up corresponding second feeding tongues in a label overlying the upraised first feeding tongues.

2. The label strip of claim 1, wherein the one surface of the support material has an adhesive release agent applied thereon.

3. The label strip of claim 1, wherein the stopper cuts are symmetrical around the longitudinal cut.

4. The label strip of claim 1, wherein at each of the intervals along the longitudinal direction at which a feeding cut group is provided, there is a plurality of feeding cut groups arrayed laterally across the support material.

5. The label strip of claim 1, wherein both of the upstream and downstream stopper cuts extend straight and in a direction transversely across the support material.

6. The label strip of claim 1, wherein at least one of the upstream and downstream stopper cuts is curved in shape and one stopper cut is curved with its convex side being away from the other of the two stopper cuts.

7. A strip of pressure-sensitive labels comprising an elongate web of support material with one surface for supporting labels thereon; label material including a series of labels having an underside to which adhesive is applied and the individual labels being overlaid on the one surface of the support material and being temporarily adhered thereto by the adhesive for being peelable off the support material;

a plurality of feeding cut groups defined in the layer of support material at intervals longitudinally along the support material; each of the feeding cut groups comprising one longitudinal cut extending longitudinally along the web of support material and further comprising an upstream transverse cut intersecting the longitudinal cut at the upstream end thereof with respect to the movement of the support material and a downstream stopper cut intersecting the longitudinal cut at the downstream end thereof, wherein the upstream stopper cut extends transversely across the support material a greater distance than the downstream stopper cut; the said longitudinal cut and the transverse stopper cuts together define two first feedng tongues in the support material at the opposite sides of the longitudinal cut between the stopper cuts; the labels on the support material having second feeding cuts defined therein and the second feeding cuts in the labels are shaped for defining second tongues in the labels; the second cuts in the labels being positioned so that the second tongues in the labels overlie respective first feeding tongues in the support material, such that upraising of first feeding tongues in the support material raises up corresponding second feeding tongues in a label overlying the upraised first feeding tongues; the said labels are placed on the support material in a series adjacent to each other and are separated by parting cuts which extend transversely across the label material for defining the individual labels in the series; the second feeding cuts in the label material extending in the longitudinal direction of the label strip and also intersecting the parting cuts, whereby a respective second feeding tongue is defined by the second feeding cuts in the trailing end of one label and the leading end of the next adjacent label.

8. A strip of pressure-sensitive labels comprising an elongate web of support material with one surface for supporting labels thereon; label material including a series of labels, each label having an underside to which adhesive is applied and the individual labels being overlaid on the one surface of the support material and being temporarily adhered thereto by the adhesive, said labels being peelable off the support material;

a plurality of feeding cut groups defined in the layer of support material at intervals longitudinally along the support material; each of the feeding cut groups comprising one longitudinal cut extending longitudinally along the web of support material and further comprising an upstream transverse cut intersecting the longitudinal cut at the upstream end thereof with respect to the movement of the support material and a downstream stopper cut intersecting the longitudinal cut at the downstream end thereof; the said longitudinal cut and the transverse stopper cuts together defining two first feeding tongues in the support material at the opposite sides of the longitudinal cut between the stopper cuts; the labels on the support material having second feedng cuts defined therein and the second feeding cuts in the labels being shaped to define second tongues in the labels; the second cuts in the labels being positioned so that the second tongues in the lables overlie respective first feeding tongues in the support material, such that upraising of first feeding tongues in the support material raises up corresponding second feeding tongues in a label overlying the upraised first feeding tongues; the second feeding cuts defining a respective U-shape in the label in which they are defined and the U-shape defines a Ushaped tongue which overlies the feeding tongues off the support material.

9. A strip of pressure-sensitive labels comprising an elongate web of support material with one surface for supporting labels thereon; label material including a series of labels, each label having an underside to which adhesive is applied and the individual labels being overlaid on the one surface of the support material and being temporarily adhered thereto by the adhesive, said labels being peelable off the support material;

a plurality of feeding cut groups defined in the layer of support material at intervals longitudinally along the support material; each of the feeding cut groups comprising one longitudinal cut extending longitudinally along the web of support material and further comprising an upstream transverse cut intersecting the longitudinal cut at the upstream end thereof with respect to the movement of the support material and a downstream stopper cut intersecting the longitudinal cut at the downstream end thereof; the said longitudinal cut and the transverse stopper cuts together defining two first feeding tongues in the support material at the opposite sides of the longitudinal cut between the stopper cuts; the labels on the support material having second feeding cuts defined therein and the second feeding cuts in the labels being shaped to define second tongues in the labels; the second cuts in the labels being positioned so that the second tongues in the labels overlie respective first feeding tongues in the support material, such that upraising of first feeding tongues in the support material raises up corresponding second feeding tongues in a label overlying the upraised first feeding tongues; both of the stopper cuts are curved; each of the stopper cuts being curved with the convex side of the curvature thereof facing away from the other of the stopper cuts.

10. A strip of pressure-sensitive labels comprising an elongate web of support material with one surface for supporting labels thereon; label material including a series of labels, each label having an underside to which adhesive is applied and the individual labels being overlaid on the one surface of the support material and being temporarily adhered thereto by the adhesive, said labels being peelable off the support material;

a plurality of feeding cut groups defined in the layer of support material at intervals longitudinally along the support material; each of the feeding cut groups comprising one longitudinal cut extending longitudinally along the web of support material and further comprising an upstream transverse cut intersecting the longitudinal cut at the upstream end thereof with respect to the movement of the support material and a downstream stopper cut intersecting the longitudinal cut at the downstream end thereof; the said longitudinal cut and the transverse stopper cuts together defining two first feeding tongues in the support material at the opposite sides of the longitudinal cut between the stopper cuts; the labels on the support material having second feeding cuts defined therein and the second feeding cuts in the labels being shaped to define second tongues in the labels; the second cuts in the labels being positioned so that the second tongues in the labels overlie respective first feeding tongues in the support material, such that upraising of first feeding tongues in the support material raises up corresponding second feeding tongues in a label overlying the upraised first feeding tongues; at least one of the upstream and downstream stopper cuts being curved in shape; the downstream stopper cut includes a main section which extends in a straight line transversely of the support material and two end portions at the ends of that stopper cut which extend a distance straight toward the other of the stopper cuts.

11. A strip of pressure-sensitive labels comprising an elongate web of support material with one surface for supporting labels thereon; label material including a series of labels, each label having an underside to which adhesive is applied and the individual labels being overlaid on the one surface of the support material and being temporarily adhered thereto by the adhesive, said labels being peelable off the support material;

a plurality of feeding cut groups defined in the layer of support material at intervals longitudinally along the support material; each of the feeding cuts groups comprising one longitudinal cut extending longitudinally along the web of support material and further comprising an upstream transverse cut intersecting the longitudinal cut at the upstream end thereof with respect to the movement of the support material and a downstream stopper cut intersecting the longitudinal cut at the downstream end thereof; the said longitudinal cut and the transverse stopper cuts together defining two first feeding tongues in the support material at the opposite sides of the longitudinal cut between the stopper cuts; the labels on the support material having second feeding cuts defined therein and the second feeding cuts in the labels being shaped to define second tongues in the labels; the second cuts in the labels being positioned so that the second tongues in the labels overlie respective first feeding tongues in the support material, such that upraising of first feeding tongues in the support material raises up corresponding second feeding tongues in a label overlying the upraised first feeding tongues; said label strips comprise a first cutting group in said support material and a second feeding cut group in the label material; said groups of cuts being different in shape from each other.

* * * * *